US006751655B1

(12) United States Patent
Deutsch et al.

(10) Patent No.: US 6,751,655 B1
(45) Date of Patent: Jun. 15, 2004

(54) METHOD AND APPARATUS FOR TRANSPORT OF SCENEGRAPH INFORMATION ACROSS A NETWORK

(75) Inventors: Keith Deutsch, Palo Alto, CA (US); Pallavi Shah, Mountain View, CA (US); Gerard Fernando, Mountain View, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/551,522

(22) Filed: Apr. 18, 2000

(51) Int. Cl.[7] ............................ G06F 15/16; G06F 9/44; G06T 13/00
(52) U.S. Cl. ...................... 709/219; 709/315; 345/473
(58) Field of Search ................................ 709/203, 213, 709/212, 219, 315, 218; 345/473, 474, 748, 749, 849; 717/104, 116

(56) References Cited

U.S. PATENT DOCUMENTS

| | | | |
|---|---|---|---|
| 5,655,067 A | * 8/1997 | Takahashi et al. | 345/473 |
| 6,044,397 A | * 3/2000 | Eleftheriadis et al. | 725/139 |
| 6,154,222 A | * 11/2000 | Haratsch et al. | 345/473 |
| 6,185,602 B1 | * 2/2001 | Bayrakeri | 709/204 |
| 6,263,496 B1 | * 7/2001 | Meyer et al. | 717/114 |
| 6,445,740 B1 | * 9/2002 | Mallart et al. | 375/240.08 |
| 6,483,513 B1 | * 11/2002 | Haratsch et al. | 345/473 |
| 6,570,564 B1 | * 5/2003 | Sowizral et al. | 345/420 |
| 2002/0147729 A1 | * 10/2002 | Balfour | 707/104.1 |

FOREIGN PATENT DOCUMENTS

| | | | | |
|---|---|---|---|---|
| WO | WO 99/40542 | | 8/1999 | |
| WO | WO 200068840 A2 | * | 11/2000 | G06F/17/30 |
| WO | WO 200122370 A1 | * | 3/2001 | G06T/11/00 |
| WO | WO 200180568 A2 | * | 10/2001 | H04N/7/24 |
| WO | WO 200235344 A2 | * | 5/2002 | G06F/09/00 |

OTHER PUBLICATIONS

Ball, D. et al., "A prototype hotel browsing system using JAVA3D", IEEE International Conference on Information Visualization, pp. 464–469, Jul. 1999.*
Salisbury, C.F. et al., "Web–based simulation visualization using Java3D", IEEE Simulation Conference Proceedings, vol. 2, pp. 1425–1429, Dec. 1999.*
Swaminathan, V. et al., "MPEG–J: Java application engine in MPEG–4", IEEE International Symposium on Circuits and Systems, vol. 1, pp. 44–47, May 2000.*
XP 000569107 Declarative Scenes Modeling With Dynamic Links And Decision Rules Distributed Among the Objects; Graphics, Design and Visualization (B–9); S.P. Mudur and S.N. Pattanak, BNSDOCID: XP569107A; 1993 FIP.
XP 000928095 Delivering Object–Based Audio Visual Services; IEEE Transactions on Consumer Electronics, vol. 45, No. 4, Nov. 1999, BNSDOCID XP 928095 A 0099 3063/99 IEE; Kalva, Eleftherladis. Zamora; pp. 1108–1111.
Standardizing Hypermedia Information Objects; ISO's Multimedia and Hypermedia Information Coding Expert Group; Kretz and Colaitis, 0163–68049/92 1992 IEEE824–7504; IEEE Communications Magazine May 1992; pp. 60–70.

* cited by examiner

Primary Examiner—Jason D. Cardone
(74) Attorney, Agent, or Firm—O'Melveny & Myers LLP

(57) ABSTRACT

A server obtains a build object comprising a data structure and one or more methods configured to build a scenegraph from scenegraph information stored in the data structure. A spawning process on the server initializes the build object by writing scenegraph information of a desired scenegraph into the data structure of the build object. The initialized build object is then transmitted to the client and loaded. One or more methods of the build object are invoked at the client to generate the desired scenegraph from the information contained in the build object's data structure. The scenegraph building mechanisms are transparent to the client. Thus, the format by which the scenegraph is represented in the data structure of the build object and/or the build methods of the build object may vary among servers, or may vary for the same server over time, without requiring the client to be reprogrammed.

28 Claims, 6 Drawing Sheets

METHOD AND APPARATUS FOR TRANSPORT OF SCENEGRAPH INFORMATION ACROSS A NETWORK

BACKGROUND OF THE INVENTION

1. FIELD OF THE INVENTION

This invention relates to the field of computer network communication, and, more specifically, to the transportation of scenegraph information across a network.

Sun, Sun Microsystems, the Sun logo, Java, Java 3D and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. BACKGROUND ART

In present computer systems, it is possible to create a visual representation of a scene in which the scene description contains information regarding three physical dimensions. The use of such "3D" scenes is becoming increasingly important as a way to create "user friendly" interfaces to complex software applications, for example. In current practice, 3D scene descriptions are frequently organized in the form of directed acyclic graphs called scenegraphs. A scenegraph is a tree structure comprising a multiplicity of nodes interconnected in a hierarchical manner. This hierarchical structure provides a well-organized framework for describing a 3D scene, and one in which functionality may be easily augmented through the addition of one or more nodes to an existing scenegraph.

A consideration in the use of scenegraphs is that computer systems are frequently operated in conjunction with a network. It is therefore desirable to transfer scenegraph information across the network in a platform and application independent manner. There presently exist schemes that attempt to accomplish such a transfer of scenegraph information. One such scheme involves representing scenegraph information in the "Virtual Reality Modeling Language" (VRML), and transmitting the VRML data in an editable text file across a network using standard network protocols, such as http and ftp. These techniques use a textually represented (e.g., ASCII) sequence of symbols as a least common denominator for reliably transferring scenegraph descriptions. Sometimes the textual sequences are compressed into a binary format for transmission purposes.

A problem with using VRML and other passive, fixed-format mechanisms for transporting scenegraph information is that the receiving client application must include a mechanism for parsing and interpreting the received scenegraph information to construct the 3D scene. There is little flexibility for altering the representation of the scenegraph information for transmission, even if more efficient representations are developed, because the client's implementation of the parser/interpreter is fixed. A new format would require reprogramming of the client application to add the necessary parsing and interpreting support.

Scenegraph Techniques

The scenegraph programming model provides a simple and flexible mechanism for representing and rendering scenes. Individual graphics elements are constructed as separate node objects and connected together in a treelike structure. Those node objects are then manipulated using their predefined accessor, mutator and node-linking methods.

For reference, an object is a programming unit that groups together a data structure (one or more instance variables) and the operations (methods) that can use or affect that data. Thus, an object consists of data and one or more operations or procedures that can be performed on that data. An object can be instructed to perform one of its methods when it receives a "message." A message is a command or instruction sent to the object to execute a certain method. A message consists of a method selection (e.g., method name) and zero or more arguments. A message tells the receiving object what operations to perform.

Any given object is an "instance" of a particular class. A class provides a definition for an object which typically includes both fields (e.g., variables) and methods. (The term "object" by itself is often used interchangeably to refer to a particular class or a particular instance.) An instance of a class includes the variables and methods defined for that class. Multiple instances can be created from the same class.

The scenegraph contains a complete description of the entire scene, or virtual universe. This includes the geometric data, the attribute information, and the viewing information needed to render the scene from a particular point of view. In the case of a 3D scene, the scenegraph hierarchy promotes a spatial grouping of geometric objects found at the leaves (i.e., end nodes) of the scenegraph. Internal nodes act to group their children together. A group node may also define a spatial bound that contains all the geometry defined by its descendants. Spatial grouping allows for efficient implementation of operations such as proximity detection, collision detection, view frustrum culling and occlusion culling.

Node objects of a scenegraph may be separated into "group node" objects and "leaf node" objects. Group node objects group together one or more child nodes, and can be used to define behavior or relationships common to those child nodes. Leaf node objects contain the actual definitions of shapes (geometry), lights, fog, sound, etc. A leaf node has no children and only one parent. The state of a leaf node includes any state in a direct path between the leaf node and the source or "root" node of the scenegraph. When a scene is rendered, the renderer incorporates all state changes made in a direct path from the root node of the scenegraph to a leaf node object in the drawing of that leaf node object.

Figure 1:
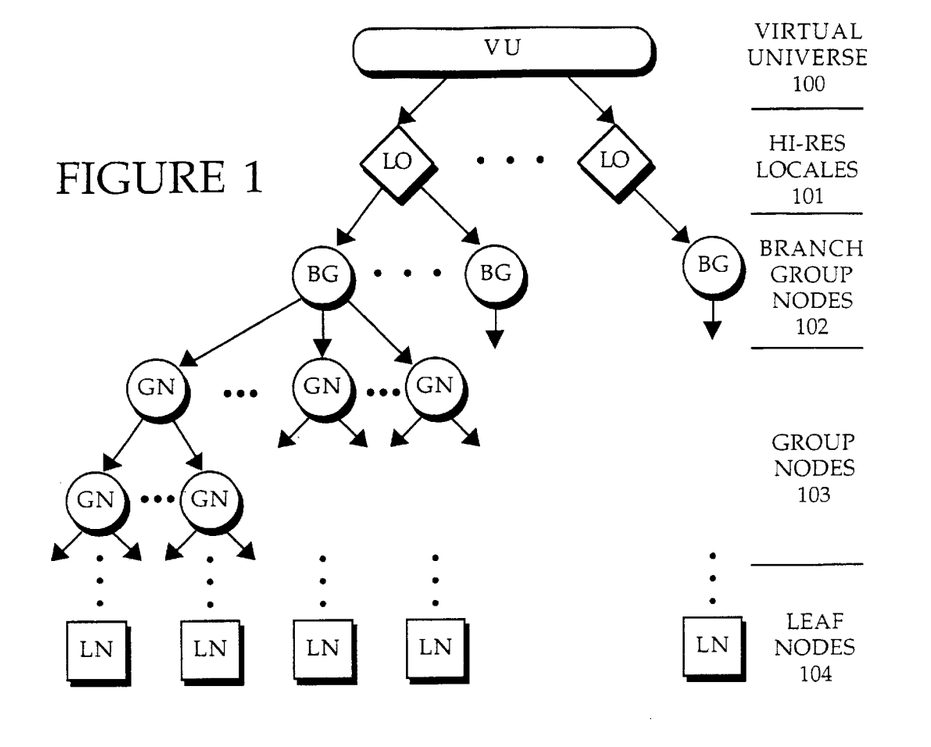
FIG. 1 is a block diagram of a general embodiment of a scenegraph for representing 3D scenes.

FIG. 1 illustrates a general scenegraph structure used to represent a 3D scene in accordance, for example, with scenegraph policies as described in the Java 3D™ API Specification available from Sun Microsystems, Inc. The scenegraph of FIG. 1 comprises a single root node, referred to as virtual universe (VU) 100, one or more locale nodes (LO) 101, one or more branch group nodes (BG) 102, one or more group nodes (GN) 103, and one or more leaf nodes (LN) 104.

Virtual universe 100 represents the center of the scene, with all child nodes being positioned relative to it. One or more high-resolution locale nodes 101 are coupled to virtual universe 100. Each such locale node 101 specifies a relative offset position with respect to virtual universe 100. This relative offset is represented in a high-resolution format to accommodate distance relationships comparable to the smallest and largest conceived distances in the real world. Each locale node 101 may be used to attach one or more branch group nodes 102, whose rendering positions are interpreted relative to the given locale node 101.

Branch group nodes 102 generally act as a root node of a subgraph associated with the given parent locale node 101.

When a branch group node 102 is attached to a locale node 101, and hence to a virtual universe 100, the branch group node and its descendants are considered "live" (i.e., ready to render) with respect to the scene. One or more general group nodes 103 may be attached as child nodes to each branch group node 102. Each group node 103 may support zero or more child nodes in the form of further group nodes 103 or leaf nodes 104.

An example of an implementation of a group node 103 is as a transform node that contains a transform matrix used to scale, rotate, and position its descendants. Other group nodes implemented as "behavior" nodes may be used to embody algorithms for modifying the transform matrices of specified transform objects. Certain leaf node objects may also have references to component objects (not shown) which specify specific attributes of the given leaf node object (e.g., a shape leaf node may have as associated component objects a geometry component object, specifying a geometric shape of the shape leaf node, and an appearance component object, specifying the appearance of the shape in terms of color, texture, etc.). One leaf node is typically used to represent the viewing platform for rendering purposes, with associated component objects for specifying attributes of the rendering viewpoint, as well as the canvas or screen on which the rendered output is to be displayed.

In the construction of a scenegraph, a child node object is attached to a parent group node object by calling the "addChild" method of the parent node object and specifying the child node object in the input field. A reference to the child node object is then stored in the parent node object, enabling general scenegraph mechanisms, such as traversal methods, to be implemented between the parent and child node objects. Other specific mechanisms for linking child nodes may be implemented for specific node object types. Also, constraints may be placed on what types of node objects may be linked as children to other specific node types to enforce particular nodal relationships of scenegraph implementations.

Prior Art Scenegraph Transmission

As previously stated, the representation of scenegraphs prior to their construction as linked node objects is typically in the form of textual symbols. One format for providing scenegraph information is VRML, although other formats associated with certain computer aided design applications are also used. The textual symbols are stored in an editable text file, or compressed into a binary form (e.g., in accordance with an MPEG file compression format), and transmitted to a client rendering application upon request. An example of a VRML-based scenegraph transmission scheme is illustrated in FIG. 2.

Figure 2:
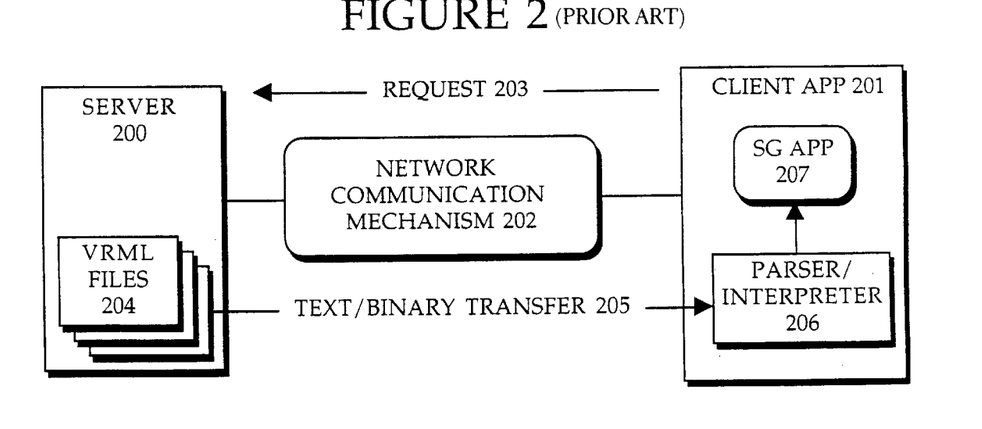
FIG. 2 is a block diagram of a prior art scheme for transporting scenegraph information across a network.

In FIG. 2, a server 200 is coupled to a client application 201 via a network communication mechanism 202, such as an internet or internet. Server 200 comprises one or more VRML files 204 containing scenegraph information associated with one or more scenes. When client application 201 wants to render a given scene, client application 201 issues a request 203 to server 200, specifying the desired scenegraph (e.g., by URL). Server 200 then transmits the desired scenegraph information (e.g., using http, ftp, or other file transfer protocols) in a text or binary transfer 205 over communication mechanism 202.

At client application 201, a parser/interpreter 206 is required to receive the transmitted VRML information, parse out the textual symbols describing the scenegraph and interpret the symbols to identify the components and interconnections of the scenegraph. Parser/interpreter 206 must then construct the scenegraph scene by performing the steps of instantiating the appropriate node classes to obtain appropriate node objects, linking the node objects as defined by the scenegraph information, and populating the node objects with any initial values specified in the scenegraph information of VRML file 204. The result of the scenegraph construction is scenegraph application 207, which may be used by client application 201 to render the desired scene.

The above transmission scheme is inefficient because client application 201 is required to include support in the form of a parser/interpreter 206 for every file format under which scenegraph information transmission is anticipated. Support for multiple transmission formats results in undesired bloating of the client application 201. Further, client application 201 must be reprogrammed and compiled to add the functionality of each new parser/interpreter 206. It would be desirable to have a scenegraph transmission scheme that provides flexible support for multiple scenegraph information formats without the need for altering the client platform.

SUMMARY OF THE INVENTION

A method and apparatus for transport of scenegraph information across a network are described. A server obtains a build object comprising a data structure and one or more methods configured to build a scenegraph from scenegraph information stored in the data structure. A spawning process on the server initializes the build object by writing scenegraph information of a desired scenegraph into the data structure of the build object. The initialized build object is then transmitted to the client and loaded. One or more methods of the build object are invoked at the client to generate the desired scenegraph from the information contained in the build object's data structure. The scenegraph building mechanisms are transparent to the client. Thus, the format by which the scenegraph is represented in the data structure of the build object and/or the build methods of the build object may vary among servers, or may vary for the same server over time, without requiring the client to be reprogrammed.

In one embodiment, transmission of the build object is accomplished by serializing the object and storing the serialized object in a distributed repository. The client either polls the repository mechanism or is notified that the serialized object has been stored therein. The client then reads the serialized object from the distributed repository and deserializes the object for loading into the client's object-oriented runtime environment.

DETAILED DESCRIPTION OF THE INVENTION

The invention is a method and apparatus for transport of scenegraph information across a network. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention. Though described herein with reference to 3D scenes, it will be apparent that embodiments of the invention are equally applicable to the transport of scenegraph information for any graph-based application.

An embodiment of the invention is directed, though not limited, to systems that utilize a server to deploy and administer scenegraph functionality across a network to one or more clients. Such systems may be implemented using object-oriented programming environments that produce executable software objects. To facilitate object compatibility between the client and server, the software objects may be implemented in a platform independent manner, or the client and server systems may share common or compatible operating platforms.

Build Object as a Scenegraph Transport Container

In contrast to the passive file formats used in the prior art for transporting scenegraph information, embodiments of the invention utilize objects as an active transport container. Scenegraph information is written into an object referred to herein as a "build object," and the object itself is transmitted from the server to the client. In addition to any accessor methods used to write the scenegraph information into the object, the build object is configured with one or more methods for building an active scenegraph application from the contained scenegraph information. Thus, the mechanism for parsing and interpreting the scenegraph information is built into the transport container.

The client is released from all constraints with respect to implementing the parsing and build processes. Multiple or new scenegraph information formats may be flexibly handled by providing separate build object classes respectively configured with build methods suitable to one of the given formats. When received by the client, the build object generates the desired scenegraph using its configured implementation in a manner transparent to the client.

Figure 3:
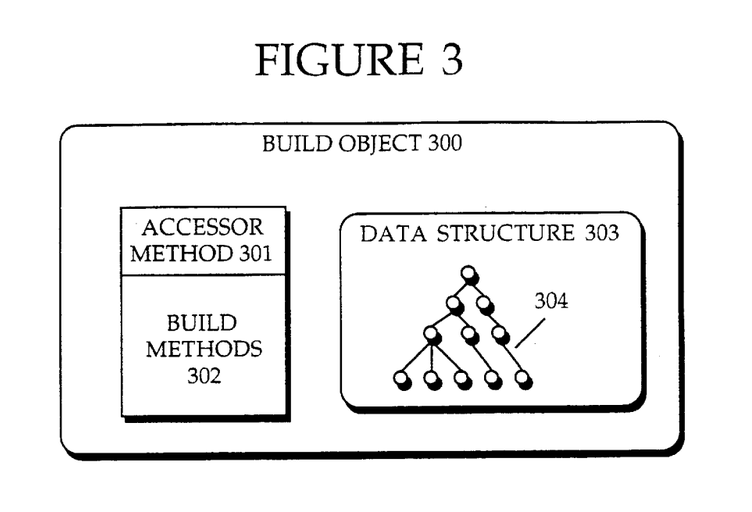
FIG. 3 is a block diagram of an apparatus for transporting scenegraph information in accordance with an embodiment of the invention.

FIG. 3 is a block diagram of a build object in accordance with an embodiment of the invention. As shown in FIG. 3, build object 300 comprises an internal data structure 303 and an accessor method 301 (or methods). Accessor method 301 is called by a spawning application or process within the server to write scenegraph information 304 into internal data structure 303. Additionally, build methods 302 of build object 300 are configured to parse the enclosed scenegraph information 304, and generate a scenegraph structure of linked node objects in accordance with the parsed information.

Internal data structure 303 may be implemented with any data type or data types capable of storing scenegraph information 304, depending on the format of scenegraph information 304. The data structure implementation may vary for different classes or subclasses of build object 300. For example, scenegraph information 304 may comprise a list of class identifiers associated with the types of node objects in the desired scenegraph structure, where the interconnection of the associated node objects is implicit in the ordering of the class identifiers. This implicit relationship is then recognized by build method 302 in the generation of the desired scenegraph structure. A list of initial data values may be associated with each listed class identifier for purposes of initializing each node object in the generated scenegraph structure. Internal data structure 303 may be implemented, for example, as a "Vector" data structure, which comprises an array of elements that may be of any data type and of any length. Other data structures or combinations of data structures may also be used.

In one possible implementation of build method 302, the following steps may be performed to build a scenegraph structure. A loop is executed that enumerates the class identifiers listed in internal data structure 303. For each class identifier, the identified class is instantiated as a node object and linked to its parent node object (e.g., by calling the "addChild( )" method of the parent) suggested either implicitly by the ordering of the list or by some other mechanism such as an explicit parent (or child) identifier. It is also possible to obtain existing or newly-instantiated objects of a general scenegraph object superclass, and explicitly re-cast the general scenegraph objects as the class type associated with the current class identifier from the list.

Any data values associated with a particular object identifier may be input into the instantiated node object by stepping selectively or exhaustively through the object's accessor methods. In some embodiments, metadata may be included with the data values for use in identifying the object attributes, and hence the specific accessor methods, for initializing the respective data values. As previously stated, the implementations of the internal data structure 303 and build method 302 are flexible and may vary for different build object subclasses and different embodiments.

In an embodiment of the invention, the build object is implemented as a serializable object. Serializable objects can be broken down into a set of data bytes containing metadata attribute descriptions and associated object state which may be reconstituted (i.e., "deserialized") later by the same or a different application to generate a copy of the original object. Serialization provides a useful mechanism for object persistence and transmission. With respect to persistence, a serialized object may be stored in memory for any length of time and regenerated with the same state the object had at the time it was serialized. With respect to object transmission, a serialized object may be transmitted between remote clients and servers as data streams or packets in accordance with known communication protocols, such as the protocol implemented by the Remote Method Invocator (RMI) API. Also, serialized objects may be written to a shared portion of memory by one application and read out of the shared memory by another application.

Figure 4:
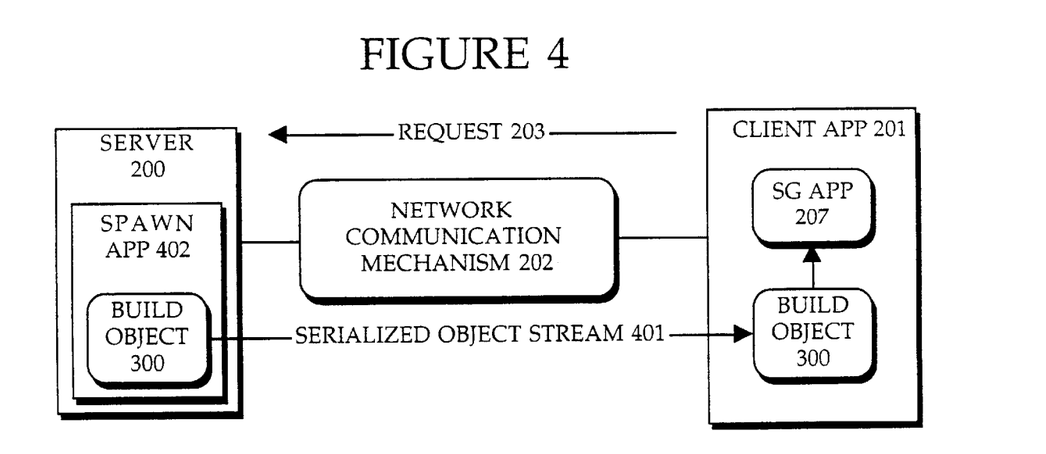
FIG. 4 is a block diagram of a build object in accordance with an embodiment of the invention.

FIG. 4 is a block diagram illustrating an apparatus for transporting scenegraph information in accordance with an embodiment of the invention. FIG. 4 comprises server 200 and client application 201 coupled via network communication mechanism 202. In one embodiment, server 200 and client application 201 are each associated with an object-oriented runtime environment.

In the system of FIG. 4, client application 201 issues a scenegraph request 203 to server 200. Request 203 may include an identifier of the desired scenegraph, or server 200 may include stored information specifying that a certain scenegraph is to be associated with client application 201. Within server 200, a spawning application or process 402 is used to initialize a build object 300 by writing the requested scenegraph information (e.g., scenegraph information 304) into build object 300. After initialization with the desired scenegraph information, build object 300 is transmitted across the network communication mechanism 202, e.g., in the form of a serialized object stream 401, to client application 201.

Once received by client application 201, build object 300 is deserialized, if necessary, and loaded into the object-oriented runtime environment of client application 201. The build methods (302) of build object 300 are invoked (e.g., by client application 201), and scenegraph application 207 is generated within the runtime environment of client application 201. Client application 201 is configured to issue a message to build object 300, invoking build methods 302. However, client application 201 does not need to know how build object 300 implements build methods 302 to generate scenegraph application 207. After scenegraph application 207 is generated, build object 300 may be discarded (i.e., garbage collected) if desired.

Figure 5A:
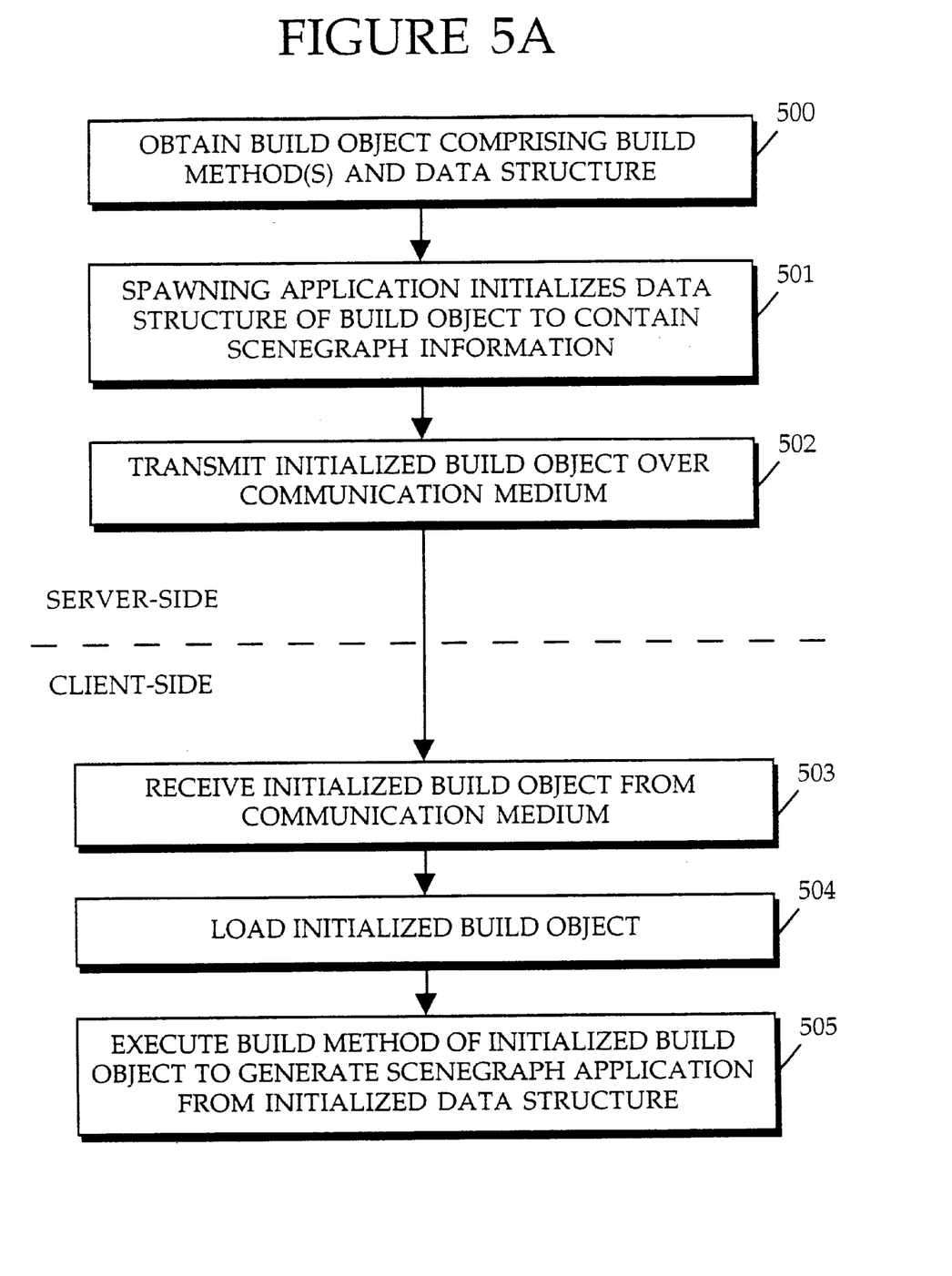
FIG. 5A is a flow diagram of a method for transporting scenegraph information in accordance with an embodiment of the invention.

A method for transporting scenegraph information in accordance with an embodiment of the invention is illustrated in the flow diagram of FIG. 5A. Steps 500–502 refer to server-side operations, whereas steps 503–505 refer to client-side operations. In step 500, server 200 obtains build object 300, either by creating an instance of a build object class, or by acquiring build object 300 from a pool of existing build objects. The type of build object obtained (i.e., the particular implementation of build methods 302 and internal data structure 303) may be preset or the type may be selected from multiple available types based on the given format of the desired scenegraph information. In step 501, spawning application 402 of server 200 initializes the obtained build object 300 to contain scenegraph information 304, and, in step 502, the initialized build object 300 is transmitted over the communication medium (e.g., network communication mechanism 202), targeted to the destination client application 201.

In step 503, client application 201 (or the client runtime environment) receives initialized build object 300 from the communication medium, and, in step 504, build object 300 is loaded into the runtime environment of client application 201. In step 505, client application 201 invokes the build methods 302 of build object 300, which generate the desired scenegraph application 207 using the scenegraph information 304 of the initialized data structure 303 in build object 300.

In accordance with one or more embodiments of the invention, the object-based communication mechanism for transferring scenegraph information utilizes the same object-oriented programming and communication paradigms as the server-client implementation itself. Unlike the prior art, embodiments of the invention are able to leverage object-based middleware to enhance connectivity. An example of such object-based middleware is the JavaSpaces™ technology developed by Sun Microsystems, Inc, which provides a distributed repository mechanism that may be used for object exchange between a server and client. The client may poll the distributed repository to detect an expected incoming object, or the client may register with the repository mechanism to receive notification when a particular object is placed in the repository.

Figure 5B:
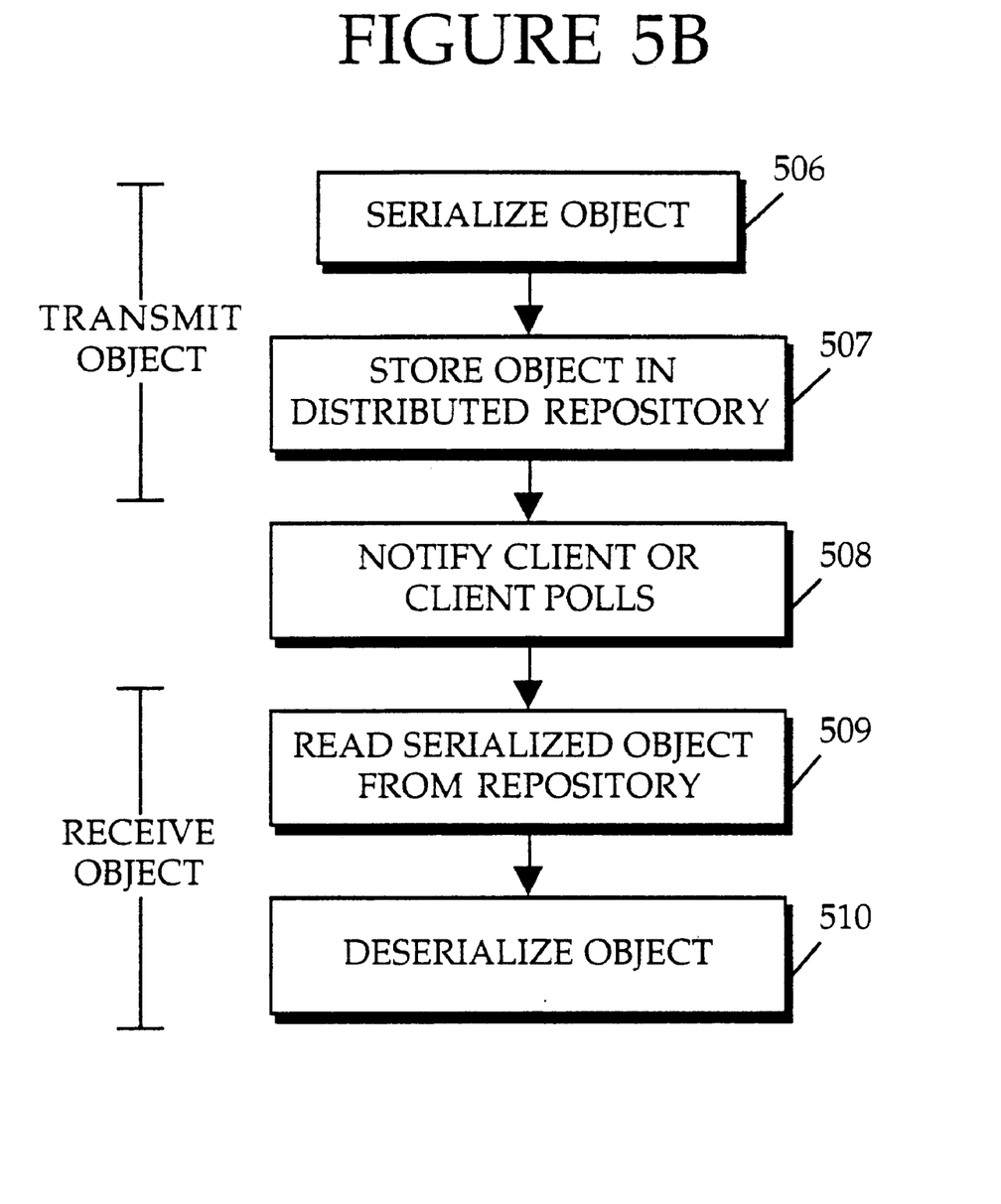
FIG. 5B is a flow diagram of a method for transporting objects over a network in accordance with an embodiment of the invention.

FIG. 5B is a flow diagram of an object transmission process utilizing an object repository in accordance with an embodiment of the invention. In step 506, the object being transmitted (e.g., build object 300) is serialized. In step 507, the server stores the serialized object in the distributed repository, using an API (application programming interface) of the repository mechanism. In step 508, the client is made aware of the presence of the stored object in the repository, either through polling or notification. Once aware of the object, the client reads the stored (and serialized) object from the repository in step 509. To complete the transmission process, in step 510, the client deserializes the object for use in the client runtime environment.

In accordance with the above transmission process, an object is transmitted between the server and the client at the object programming level via a distributed repository mechanism. The underlying network mechanisms facilitating the object transmission are handled by the repository mechanism, and are transparent to the server and client.

In an embodiment of the invention, the clients and server may execute within separate machine or virtual machine runtime environments, within a single runtime environment, or some combination of the foregoing arrangements. The following description refers to an embodiment of a virtual machine-based runtime environment, though it will be obvious that the invention is not limited to such.

Embodiment of a Processing Environment

Applications typically comprise one or more object classes. Classes written in high-level programming languages, such as the Java™ programming language, may be compiled into machine independent bytecode class files. Alternatively, classes may be compiled into machine dependent, executable program code for direct execution by a given hardware platform. In the machine independent case, each class file contains code and data in a platform-independent format called the class file format. The computer system acting as the execution vehicle contains a program called a virtual machine, which is responsible for executing the code in each class file. (A hardware system may also be used that directly executes bytecode of class files.)

In a virtual machine environment, the classes of an application are loaded on demand from the network (stored on a server), or from a local file system, when first referenced during the application's execution. The virtual machine locates and loads each class file, parses the class file format, allocates memory for the class's various components, and links the class with other already loaded classes. This process makes the code in the class readily executable by the virtual machine.

Figure 6:
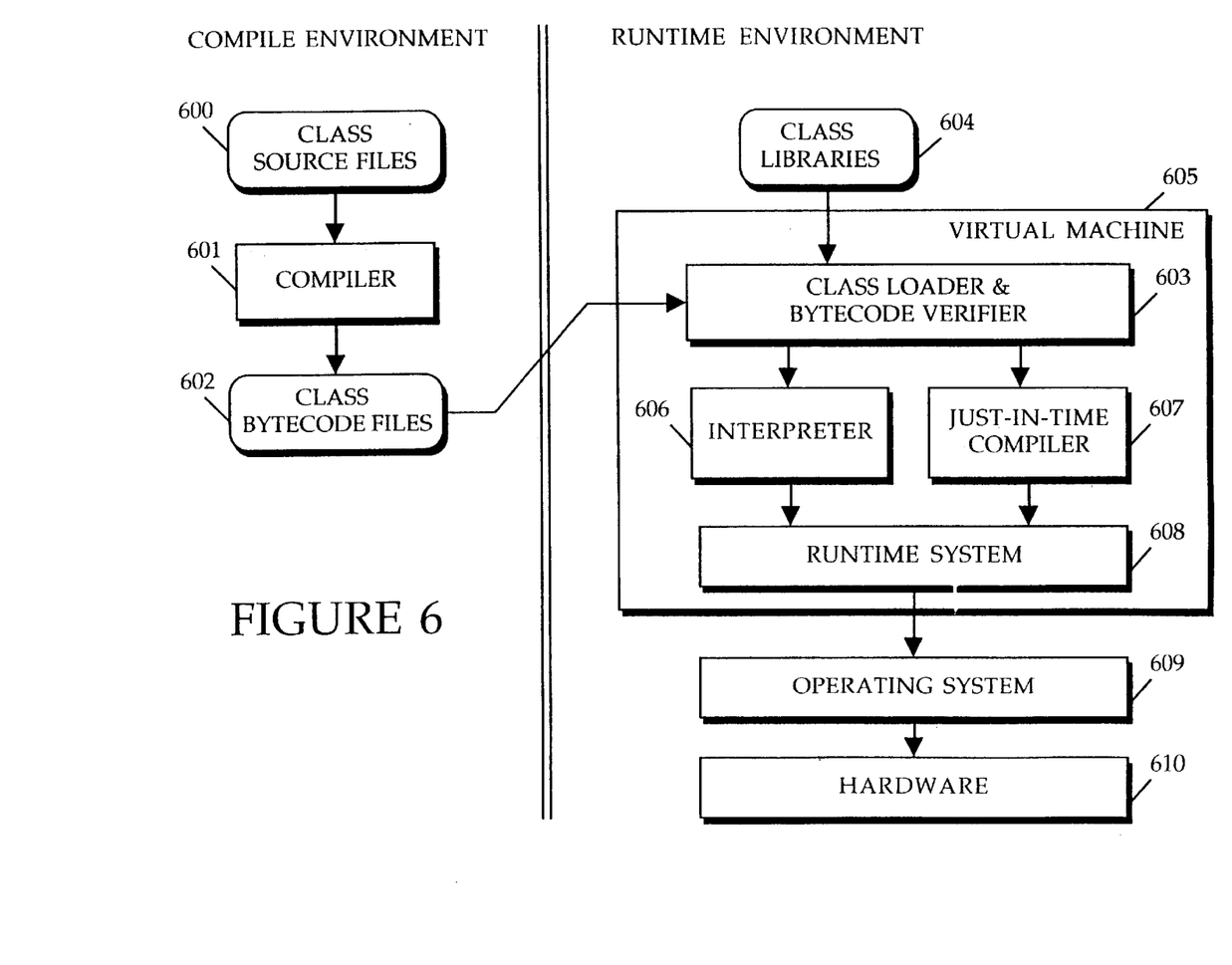
FIG. 6 is a block diagram of a processing environment comprising an object-oriented runtime environment capable of providing a suitable software execution environment for an embodiment of the invention.

FIG. 6 illustrates the compile and runtime environments for an example processing system. In the compile environment, a software developer creates source files 600, which contain the programmer readable class definitions written in the source programming language, including data structures, method implementations and references to other classes. Source files 600 are provided to pre-compiler 601, which compiles source files 600 into ".class" files 602 that contain bytecodes executable by a virtual machine. Bytecode class files 602 are stored (e.g., in temporary or permanent storage) on a server, and are available for download over a network. Alternatively, bytecode class files 602 may be stored locally in a directory on the client platform.

The runtime environment contains a virtual machine (VM) 605 which is able to execute bytecode class files and execute native operating system ("O/S") calls to operating system 609 when necessary during execution. Virtual machine 605 provides a level of abstraction between the machine independence of the bytecode classes and the machine-dependent instruction set of the underlying computer hardware 610, as well as the platform-dependent calls of operating, system 609.

Class loader and bytecode verifier ("class loader") 603 is responsible for loading bytecode class files 602 and supporting class libraries 604 into virtual machine 605 as needed. Class loader 603 also verifies the bytecodes of each class file to maintain proper execution and enforcement of security rules. Within the context of runtime system 608, either an interpreter 606 executes the bytecodes directly, or a "just-in-time" (jIT) compiler 607 transforms the bytecodes into machine code, so that they can be executed by the processor (or processors) in hardware 610.

The runtime system 608 of virtual machine 605 supports a general stack architecture. The manner in which this general stack architecture is supported by the underlying hardware 610 is determined by the particular virtual machine implementation, and reflected in the way the bytecodes are interpreted or JIT-compiled. Other elements of the runtime system include thread management (e.g., scheduling) and garbage collection mechanisms.

Embodiment of Computer Execution Environment (Hardware)

Figure 7:
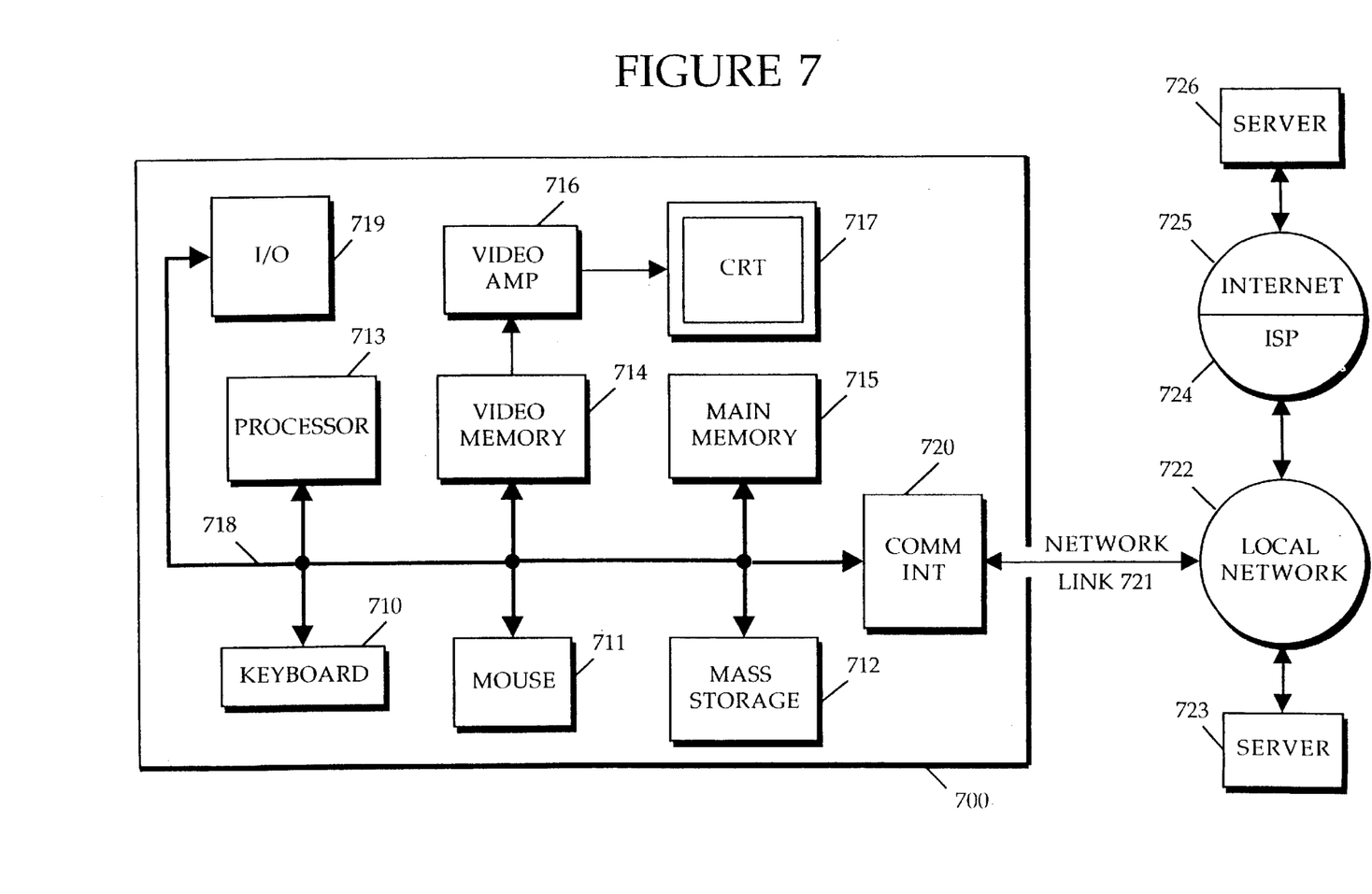
FIG. 7 is a block diagram of one embodiment of a computer system capable of providing a suitable hardware execution environment for an embodiment of the invention.

An embodiment of the invention can be implemented as computer software in the form of computer readable code executed on any computer processing platform, or in the form of bytecode class files executable within a runtime environment running on such a processing platform. An embodiment of the invention may be implemented in any type of computer system or programming or processing environment, including embedded devices (e.g., web phones, etc.) and "thin" client processing environments (e.g., network computers (NC's), etc.). An example of a general computer system is illustrated in FIG. 7. The computer system described below is for purposes of example only.

In FIG. 7, keyboard 710 and mouse 711 are coupled to a system bus 718. The keyboard and mouse are for introducing user input to the computer system and communicating that user input to processor 713. Other suitable input devices may be used in addition to, or in place of, the mouse 711 and keyboard 710. I/O (input/output) unit 719 coupled to system bus 718 represents such I/O elements as a printer, A/V (audio/video) I/O, etc.

Computer 700 includes a video memory 714, main memory 715 and mass storage 712, all coupled to system bus 718 along with keyboard 710, mouse 711 and processor 713. The mass storage 712 may include both fixed and removable media, such as magnetic, optical or magnetic optical storage systems or any other available mass storage technology. Bus 718 may contain, for example, address lines for addressing video memory 714 or main memory 715. The system bus 718 also includes, for example, a data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a SPARC microprocessor from Sun Microsystems, Inc. or a microprocessor manufactured by Intel, such as the 80X86, or Pentium processor, or a microprocessor manufactured by Motorola, such as the 680X0 processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images. Alternatively, the video memory could be used to drive a flat panel or liquid crystal display (LCD), or any other suitable data presentation device.

Computer 700 may also include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Communication interface 720 could also be a cable modem or wireless interface. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by an Internet Service Provider (ISP) 724. ISP 724 in turn provides data communication services through the world wide packet data communication network now commonly referred to as the "Internet"725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Computer 700 can send messages and receive data, including program code, through the network(s), network link 721, and communication interface 720. In the Internet example, remote server computer 726 might transmit a requested code for an application program through Internet 725, ISP 724, local network 722 and communication interface 720.

The received code may be executed by processor 713 as it is received, and/or stored in mass storage 712, or other non-volatile storage for later execution. In this manner, computer 700 may obtain application code in the form of a carrier wave. Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Thus, a method and apparatus for transport of scenegraph information across a network have been described in conjunction with one or more specific embodiments. The invention is defined by the claims and their full scope of equivalents.

What is claimed is:

1. In a computer system, a method comprising:
   initializing an object with scenegraph information;
   transmitting said object to a client over a network; and invoking one or more methods of said object to build a scenegraph application from said scenegraph information.

2. The method of claim 1, wherein transmitting said object comprises:

serializing said object;

transferring said serialized object from said server to said client; and deserializing said object.

3. The method of claim 2, wherein transferring said serialized object comprises:

said server storing said serialized object in a repository; and said client reading said serialized object from said repository.

4. The method of claim 3, wherein transferring said serialized object further comprises notifying said client that said serialized object is stored in said repository.

5. The method of claim 3, wherein transferring said serialized object further comprises said client polling said repository to determine if said serialized object is stored therein.

6. The method of claim 1, wherein initializing said object comprises storing said scenegraph information in a data structure of said object.

7. The method of claim 1, wherein initializing is performed by a spawning process of a server.

8. The method of claim 1, further comprising loading said object into a runtime environment of said client.

9. The method of claim 1, wherein invoking said one or more methods of said object to build a scenegraph application further comprises:

said one or more methods instantiating one or more node objects identified in said scenegraph information; and said one or more methods linking said one or more node objects based on said scenegraph information.

10. A computer program product comprising:

a computer readable medium having computer program code embodied therein for transmitting scenegraph information across a network, the computer readable medium comprising computer program code configured to cause a computer to:

initialize an object with scenegraph information;

transmit said object to a client over a network; and invoke one or more methods of said object to build a scenegraph application from said scenegraph information.

11. The computer program product of claim 10, wherein transmitting said object comprises:

serializing said object;

transferring said serialized object from said server to said client; and deserializing said object.

12. The computer program product of claim 11, wherein transferring said serialized object comprises:

said server storing said serialized object in a repository; and said client reading said serialized object from said repository.

13. The computer program product of claim 12, wherein transferring said serialized object further comprises notifying said client that said serialized object is stored in said repository.

14. The computer program product of claim 12, wherein transferring said serialized object further comprises said client polling said repository to determine if said serialized object is stored therein.

15. The computer program product of claim 10, wherein initializing said object comprises storing said scenegraph information in a data structure of said object.

16. The computer program product of claim 10, wherein initializing is performed by a spawning process of a server.

17. The computer program product of claim 10, wherein said computer program code is further configured to cause a computer to load said object into a runtime environment of said client.

18. The computer program product of claim 10, wherein invoking said one or more methods of said object to build a scenegraph application further comprises:

said one or more methods instantiating one or more node objects identified in said scenegraph information; and said one or more methods linking said one or more node objects based on said scenegraph information.

19. An apparatus comprising:

an object comprising:

a data structure;

one or more methods configured to build a scenegraph application using said data structure;

a server configured to initialize said object by storing scenegraph information in said data structure, said server configured to transmit said object;

a client configured to receive said object, said client further configured to invoke said one or more methods.

20. The apparatus of claim 19, further comprising a communication medium coupled to said server and said client, said communication medium comprising an object repository.

21. The apparatus of claim 20, wherein said server is configured to transmit said object by writing said object into said object repository.

22. The apparatus of claim 21, wherein said client is configured to receive said object by reading said object from said object repository.

23. The apparatus of claim 19, wherein said client further comprises a runtime environment, and wherein said client is configured to load said object into said runtime environment.

24. The apparatus of claim 23, wherein said scenegraph application is built within said runtime environment.

25. The apparatus of claim 19, wherein said server comprises a spawning process configured to initialize said object.

26. The apparatus of claim 19, wherein:

said object is serializable;

said server is configured to serialize said object; and said client is configured to deserialize said object.

27. The apparatus of claim 19, wherein said scenegraph information comprises one or more class identifiers corresponding to one or more nodes of said scenegraph application.

28. An apparatus comprising:

means for initializing an object with scenegraph information;

means for transmitting said object to a client over a network; and means for invoking one or more methods of said object to build a scenegraph application from said scenegraph information.

* * * * *